United States Patent [19]

Gembicki et al.

[11] 4,040,979

[45] Aug. 9, 1977

[54] HYDROCARBON CONVERSION CATALYTIC COMPOSITE

[75] Inventors: Stanley A. Gembicki, Western Springs, Ill.; John I. Hammerman, Ardmore, Okla.

[73] Assignee: UOP Inc., Des Plaines, Ill.

[21] Appl. No.: 660,749

[22] Filed: Feb. 23, 1976

[51] Int. Cl.² .......................... B01J 27/02; B01J 29/06
[52] U.S. Cl. ............................... 252/439; 252/455 R; 252/458; 252/459
[58] Field of Search .................... 252/455 R, 458, 439

[56] References Cited

U.S. PATENT DOCUMENTS

| | | | |
|---|---|---|---|
| 3,523,913 | 8/1970 | O'Hara | 252/455 R |
| 3,639,272 | 2/1972 | Elliott, Jr. et al. | 252/458 X |
| 3,661,805 | 5/1972 | Horvath | 252/458 X |
| 3,751,380 | 8/1973 | O'Hara | 252/439 |

*Primary Examiner*—Carl F. Dees
*Attorney, Agent, or Firm*—James R. Hoatson, Jr.; Thomas K. McBride; William H. Page, II

[57] ABSTRACT

A catalytic composite, comprising a combination of a nickel component and a tungsten component with a silica-alumina carrier material wherein the atomic ratio of nickel to nickel plus tungsten is about 0.1 to about 0.3. The key feature of the subject composite is the criticality of the ratio of nickel to nickel plus tungsten. The principal utility of the subject composite is in the hydrocracking of hydrocarbons. A specific example of the catalyst disclosed is a combination of nickel and tungsten with a silica-alumina carrier material containing 50 wt.% alumina in amounts sufficient to result in the composite having an atomic ratio of nickel to nickel plus tungsten of 0.2.

5 Claims, 1 Drawing Figure

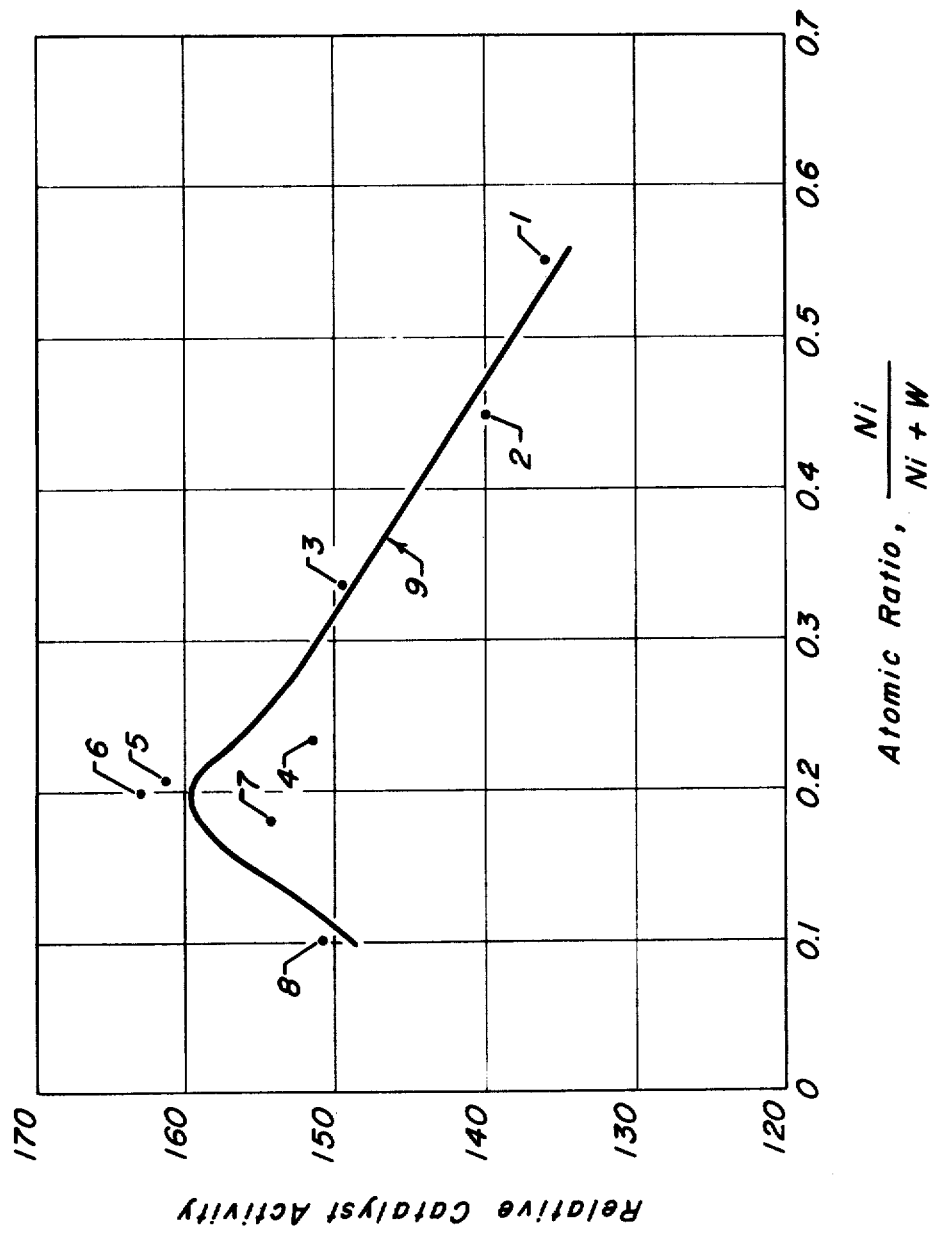

HYDROCARBON CONVERSION CATALYTIC COMPOSITE

The subject of the present invention is a novel catalytic composite which has exceptional activity, selectivity and resistance to deactivation when employed in a hydrocarbon conversion process. This invention also relates to the preparation of a novel catalytic composite. More particularly, the invention relates to a catalyst which is useful for performing destructive hydrogenation of hydrocracking of hydrocarbons.

Destructive hydrogenation by catalytic means, more commonly called hydrocracking, is old and well-known to the art. Destructive hydrogenation of the hydrocarbon oil, which is usually a coal tar or a high-boiling petroleum fraction, such as gas oils or topped crude, generally is performed at relatively high temperatures and pressures of the order of 750° F. or 1500 psig. and upward. Catalysts for the destructive hydrogenation of hydrocarbons are generally a combination of hydrogenation and cracking catalysts.

While many types of catalyst compositions have been proposed for destructive hydrogenation or hydrocracking, it has been found that catalysts comprised of silica, alumina, tungsten and nickel are especially suitable. Such catalysts are well known in the hydrocracking art.

From U.S. Pat. No. 3,216,922, a process is known for the preparation of hydrocracking catalysts comprising a silica-alumina mixture as a carrier in which the carrier is obtained by first precipitating silica gel from a water glass solution and subsequently, after aging of the gel, precipitating aluminum hydroxide thereon. As the aluminum salt from which the aluminum hydroxide is formed, use is made of aluminum sulfate which is added in such a quantity that the molar ratio of silica to alumina in the finished carrier is approximately 5:1. It was found, however, that the use of hydrocracking catalysts, of which the carrier was obtained in the manner described, produced less favorable results in the hydrocracking of flashed distillates.

In an effort to prepare a more satisfactory hydrocracking catalyst, British Pat. No 1,183,778 teaches a process for the preparation of an alumina-silica-nickel-tungsten hydrocracking catalyst which comprises preparing a catalyst carrier by first precipitating from an aqueous solution comprising silicate ions, a silica gel, subjecting the gel to aging at elevated temperature, precipitating aluminum hydroxide on the aged gel by addition of an aqueous aluminum nitrate solution and an alkaline-reacting solution, separating, drying and finally calcining the resulting precipitate of aluminum hydroxide on silica gel and then supporting tungsten and nickel on the catalyst carrier and subsequently oxidizing the carrier comprising the metal salts.

However, because commercial scale hydrocracking of hydrocarbons is performed at low space velocities, catalyst cost is an appreciable factor in both the initial investment and operating costs of hydrocracking plants. For this reason, there is considerable incentive to manufacture such catalysts by the most economic method while improving the catalyst activity. We have discovered an improved process for the preparation of tungsten-nickel on silica-alumina hydrocracking catalyst.

More specifically, we have found that particular atomic ratios of the nickel and tungsten components provide an exceptional catalyst for hydrogenation reaction and particularly for hydrocracking reactions. In addition to being superior catalytically, the catalyst of the present invention is more economically produced than prior art catalysts since excessive metals levels aren't employed. More specifically, our process is an improved process for the preparation of such catalyst wherein the atomic ratio of nickel to nickel plus tungsten is about 0.1 to about 0.3 . The criticality of the atomic ratio is further illustrated hereinbelow.

Although any silica-alumina carrier material may suitably be used to prepare the catalyst of this invention, a particularly preferred carrier material is a co-gelled silica-alumina comprising from about 40 to about 60 percent alumina and from about 60 percent to about 40 percent silica. It is also preferred that the carrier material have adequate pore volume, that is, a pore volume of at least 0.5 cc/g, The co-gelled silica-alumina carrier is preferably in xerogel state, that is, it is dried sufficiently to afford the usual microporous structure and therefore has an appreciable available surface. It is also possible to use a rigid silica-alumina catalyst base which has merely been dried at a relatively low temperature, e.g. 125° C., and which still contains considerable amounts of water. In this latter case, however, the degree of drying must nevertheless be sufficient to remove essentially all water from the pores of the base.

The catalyst of the present invention can be utilized to achieve the maximum production of LPG (liquefied petroleum gas) in the propane/butane range from naphtha or gasoline boiling range distillates. Heavier charge stocks, including kerosenes, light gas oils, heavy gas oils, full boiling range gas oils and "black oils" may be readily converted into lower-boiling, normally liquid products including gasolines, kerosenes, middle-distillates, lube oils, etc.

In one embodiment, accordingly, the present invention provides a method of preparing catalysts having hydrocracking activity comprising a method for the preparation of catalyst having hydrocracking activity comprising impregnating a silica-alumina carrier material with an aqueous solution of a nickel salt and a tungsten salt, the concentration of the salts in the aqueous solution being selected to deposit on the carrier material an atomic ratio of nickel to plus tungsten of about 0.1 to 0.3.

In a second embodiment, the present invention relates to a process for hydrocracking hydrocarbons which process comprises reacting said hydrocarbons with hydrogen in a reaction zone containing a catalytic composite prepared by a method comprising a method for the preparation of catalyst having hydrocracking activity comprising impregnating a silica-alumina carrier material with an aqueous solution of a nickel salt and a tungsten salt, the concentration of the salts in the aqueous solution being selected to deposit on the carrier material an atomic ratio of nickel to nickel plus tungsten of about 0.1 to 0.3.

In a specific embodiment, the hydrocracking conditions include a maximum catalyst bed temperature of about 600° F. to about 900° F., a pressure of about 500 to about 5000 psig., a liquid hourly space velocity of about 0.1 to about 10 and a hydrogen circulation rate in the range of about 1,000 to about 50,000 scf/bbl.

In another specific embodiment, the catalytic composite is oxidized, in an atmosphere of air, at a temperature about 1000° F. prior to contact with the fresh feed charge stock.

Another embodiment relates to a catalytic composite, comprising a combination of a nickel component and a tungsten component witha silica-alumina carrier material wherein the atomic ratio of nickel to nickel plus tungsten is about 0.1 to about 0.3.

Other objects and embodiments of our invention relate to additional details regarding the preferred catalytic ingredients, the concentration of components within the catalytic composite, the method of catalyst preparation, preferred processing techniques and similar particulars which are hereinafter set forth.

Catalytic composites, tailored for the conversion of hydrocarbonaceous material and particularly those intended for utilization in a hydrocracking process, have traditionally consisted of metallic elements chosen from Group VIII of the Periodic Table; however, metallic components from Group VI-B are quite often incorporated therein. In those instances where hydrocracking is intended to be accompanied by some hydrorefining (desulfurization, denitrification, etc.) the preferred metallic components have been nickel and molybdenum, and nickel and tungsten, which components are usually combined with a porous carrier material comprising both alumina and silica, either amorphous or zeolitic in nature. Ample evidence may be found in the literature which comfirms the ability of nickel component to effect both cracking and hydrogenation reactions. Furthermore, the prior art indicates a preference for two particular methods of catalyst preparation. Predominantly preferred is an impregnating procedure wherein a previously calcined, preformed carrier material, which is precipitated in a multi-step manner as hereinabove described, is contacted with suitable soluble compounds of the nickel component and the Group VI-B component, where the latter is utilized. Impregnation invloves both subsequent drying at a temperature of about 300° F., and oxidation at a temperature of about 1100° F. The second preferred preparation scheme involves coprecipitating all the catalyst components, including those of the carrier material. Particularly effective silica-alumina-nickel-tungsten hydrocracking catalyst can be prepared when the alumina content of the co-gelled silica-alumina support is maintained within the range of from about 43 percent to about 57 percent by weight alumina.

As is customary in the art of catalysis, when referring to the catalytically active metal, or metals, it is intended to encompass the existence of such metal in the elemental state or in some form such as an oxide, sulfide, halide, etc. Regardless of the state in which the metallic components actually exist, the concentrations are computed as if they existed in the elemental state.

The co-gelled silica-alumina or any other form of silica-alumina carrier material may be prepared and utilized as spheres, pills, pellets, extrudates, granules, etc. In a preferred method of manufacture for co-gelled silica-alumina, an aqueous water glass solution, diluted to a silica concentration of from about 5 to about 15 weight percent, is acidified with hydrochloric acid or other suitable mineral acid. The resulting sol is acid aged at a pH of from about 4 to about 4.8 to form a hydrogel, and the hydrogel is further aged at a pH of from about 6.5 to about 7.5. The silica hydrogel is then thoroughly admixed with an aqueous aluminum salt solution of sufficient concentration to provide a desirable alumina content in the silica-alumina product. The silica-alumina sol is then precipitated at a pH of about 8 by the addition of a basic precipitating agent, suitably aqueous ammonium hydroxide. The silica-alumina, which exists as a hydrogel slurried in a mother liquor, is recovered by filtration, water-washed and dried at a temperature of from about 200° F. to about 500° F. Drying is preferably by spray-drying techniques whereby the co-gelled silica-alumina is recovered as microspheres, admixed with a suitable binding agent, such as graphite, polyvinyl alcohol, etc., and extruded or otherwise compressed into pills or pellets of uniform size and shape.

A particularly preferred method for preparing co-gelled silica-alumina support is by the well-known oil-drop method which permits the utilization of the support in the form of macrospheres. For example, an alumina sol, utilized as an alumina source, is commingled with an acidified water glass solution as a silica source, and the mixture further commingled with a suitable gelling agent, for example, urea, hexamethylenetetramine, or mixtures thereof. The mixture is discharged while still below gellation temperature, and by means of a nozzle or rotating disk, into a hot oil bath maintained at gellation temperature. The mixture is dispersed into the oil bath as droplets which form into spheroidal gel particles during passage therethrough. The alumina sol is preferably prepared by a method wherein aluminum pellets are commingled with a quantity of treated or deionized water, with hydrochloric acid being added thereto in a sufficient amount to digest a portion of the aluminum metal and form the desired sol. A suitable reaction rate is effected at about reflux temperature of the mixture.

The spheroidal gel particles prepared by the oil-drop method are aged, usually in the oil bath, for a period of at least 10–16 hours, and then in a suitable alkaline or basic medium for at least 3 to about 10 hours, and finally water-washed. Proper gellation of the mixture in the oil bath, as well as subsequent aging of the gel spheres, is not readily accomplished below about 120° F., and at about 210° F., the rapid evolution of the gases tend to rupture and otherwise weaken the spheres. By maintaining sufficient superatmospheric pressure during the forming and aging steps in order to maintain water in the liquid phase, a higher temperature can be employed, frequently with improved results. If the gel particles are aged at superatmospheric pressure, no alkaline aging step is required.

The spheres are water-washed, preferably with water containing a small amount of ammonium hydroxide and/or ammonium nitrate. After washing, the spheres are dried, at a temperature of from about 200° F. to about 600° F. for a period of from about 6 to about 24 hours or more, and then calcined at a temperature of from about 800° F. to about 1400° F. for a period of from 2 to about 12 hours or more.

The nickel component and the tungsten component are composed with the co-gelled silica-alumina carrier material by any suitable coimpregnation technique. Thus, the carrier material can be soaked, dipped, suspended, or otherwise immersed in an aqueous impregnating solution containing a soluble nickel salt and a soluble tungsten salt. One suitable method comprises immersing the carrier material in the impregnating solution and evaporating the same to dryness in a rotary steam dryer, the concentration of the impregnating solution being such as to ensure a final catalyst composite comprising an atomic ratio of nickel to nickel plus tungsten of about 0.1 to about 0.3. Another suitable method comprises dipping the carrier material into the aqueous impregnating solution at room temperature until complete penetration of carrier by the solution is achieved. After absorption of the impregnating solution, the carrier is drained of free surface liquid and dried in a moving belt calciner.

The catalyst composite is usally dried at a temperature of from about 200° F. to about 500° F. for a period of from about 1 to 10 hours prior to calcination. In accordance with the present invention, calcination is effected in an oxidizing atmosphere at a temperature of from about 700° to about 1200° F. The oxidizing atmosphere is suitably air, although other gases comprising molecular oxygen may be employed.

Following the high temperature oxidation procedure, the catalyst is usually reduced for a period of from about ½ to about 10 hours at a temperature in the range of from about 700° F. to about 1000° F. in the presence of hydrogen. The catalyst may be used in a sulfide form. Thus after reduction, the catalyst may be subjected to sulfidation by passing hydrogen sulfide, or other suitable sulfur containing compound, in contact therewith, preferably at an elevated temperature of from about 500° F to about 1100° F. The reduced catalyst is preferably sulfided by contacting the catalyst with a stream of hydrogen containing from about 1 to 20 percent or more by volume of hydrogen sulfide at elevated temperature of from about 500° F. to about 1100° F. When the petroleum hydrocarbon to be hydrocracked contains sulfur compounds, by design or otherwise, sulfidation may be suitably effected in situ in the initial stage of the hydrocracking process.

The catalyst composite, prepared in accordance with the method of this invention, is preferably employed in a reaction zone as a fixed bed. The hydrocarbon charge stock after being combined with hydrogen in an amount of from about 2000 to about 20,000 standard cubic feet per barrel, and preferably at least about 5000 standard cubic feet per barrel, is introduced into the reaction zone. The charge stock may be in a liquid, vapor, or liquid-vapor phase mixture, depending upon the temperature, pressure, proportion of hydrogen and the boiling range of the charge stock being processed. The liquid hourly space velocity through the reaction zone will be in excess of about 0.2 and generally in the range of from about 1.0 to about 15.0. The source of hydrogen being admixed with a hydrocarbon charge stock may comprise a hydrogen-rich gas stream which is withdrawn from a high-pressure, low-temperature separation zone and recycled to supply at least a portion of such hydrogen. Excess hydrogen resulting from the various dehydrogenation reactions effected in a catalytic reforming unit may also be employed in admixture with the hydrocarbon charge. The reaction zone will operate under an imposed pressure within the range of from about 80 to about 3000 pounds per square inch gauge. The catalyst bed inlet temperature is maintained within the range of from about 350° to about 800° F. Since the hydrocracking reactions are exothermic, the outlet temperature or the temperature at the bottom of the catalyst bed will be significantly higher than that at the inlet thereto. The degree of exothermicity exhibited by the temperature rise across the catalyst bed is at least partially dependent upon the character of the charge stock passing therethrough, the rate at which the normally liquid hydrocarbon charge contacts the catalyst bed, the intended degree of conversion to lower-boiling-hydrocarbon products, etc. In any event, the catalyst bed inlet temperature will be such that the exothermicity of the reactions taking place does not cause the temperature at the outlet of the bed to exceed about 900° F., and preferably 850° F. The operation may also be effected as a moving-bed type of operation in which the catalyst, hydrocarbon and hydrogen are admixed and passed as a slurry through the reaction zone.

Although the method of preparing the catalyst, and careful selection of operating conditions within the ranges hereinbefore set forth, extend the effective life of the catalyst composite, regeneration thereof may eventually become desired due to the natural deterioration of the catalytically active metallic components. The catalytic composite is readily regenerated by treating the same in an oxidizing atmosphere, at a temperature of from about 750° to about 850° F., and burning coke and other heavy hydrocarbonaceous material therefrom. The catalyst composite may then be subjected to the reducing action in hydrogen, in situ, at a temperature within the range of from about 1000° to about 1200° F. If desirable, the catalyst may then be sulfided in the same manner as fresh catalyst as hereinbefore described.

The drawing included in the instant application is for the purpose of visually demonstrating the improvements and advantages afforded by the manufacture of silica-alumina-nickel-tungsten hydrocracking catalyst according to the present invention.

The following example is presented in illustration of the catalyst of this invention and a method of preparation thereof, and is not intended as an undue limitation on the generally broad scope of the invention as set out in the appended claims.

EXAMPLE

This example describes the preparation and testing of eight silica-alumina-nickel-tungsten catalysts each having an atomic ratio of nickel to nickel plus tungsten in the range from 0.1 to 0.55. The support material for each catalyst was co-gelled silica-alumina prepared by the hereinabove described oil drop method. The finished support material was in the form of one/sixteenth inch spheres and contained 50% alumina.

Eight batches of co-gelled support material with the hereinabove described characteristics were impregnated with an aqueous solution of nickel nitrate and ammonium metatungstate. Each batch was impregnated with a solution prepared to yield the desired nickel-tungsten atomic ratio in the finished catalyst. The impregnated spheres were dried and then oxidized at a temperature of 1100° F. The eight batches of finished catalyst are hereinafter referred to as Catalyst 1 through 8 and are characterized by having an atomic ratio of nickel to nickel plus tungsten of 0.55, 0.45, 0.33, 0.23, 0.21, 0.20, 0.18 and 0.10, respectively.

Each of the catalysts prepared in this manner were then used in the hydrocracking of a vacuum gas oil whose properties are summarized in Table I.

TABLE I

| PROPERTIES OF VACUUM GAS OIL | |
| --- | --- |
| API Gravity at 60° F. | 19.8 |
| Specific Gravity at 60° F. | 0.9352 |
| Distillation, ° F. | |
| IBP | 630 |
| 5 | 700 |
| 10 | 720 |
| 30 | 778 |
| 50 | 830 |
| 70 | 890 |
| 90 | 970 |
| 95 | 1005 |
| Total Sulfur, wt.% | 2.79 |
| Total Nitrogen, wt.% | 0.16 |

The standard relative activity test procedure is conducted by processing the hereinabove described gas oil at 1500 psig, a maximum catalyst bed temperature of 775° F. and in the presence of 7500 scf./Bbl. of hydrogen. For each catalyst, three test periods of approximately eight hours duration were effected at liquid hourly space velocities which vary from about 1.0 to about 4.0. The normally liquid product effluent from each of the test periods is subjected to distillation to determine the quantity of hydrocarbons boiling below a temperature of 650° F., and these three percentages are plotted against the space velocities employed. The relative activity is determined by the ratio of the liquid hourly space velocity required to produce a product effluent of which 60% by volume is distillable at a temperature of 650° F., and comparing this liquid hourly space velocity with that of the standard catalyst. With respect to any given test catalyst, a relative activity coefficient or factor greater than 100 indicates a catalyst having greater degree of hydrocracking activity than the standard reference catalyst.

Each of the eight batches of finished catalyst were tested according to the hereinbefore described standard relative activity test procedure and the data are presented in tabular form in Table II and in graphical form in the accompanying drawing.

TABLE II
EVALUATION FOR HYDROCRACKING ACTIVITY

| CATALYST IDENTITY | ATOMIC RATIO, Ni / (Ni + W) | CATALYST ACTIVITY |
|---|---|---|
| 1 | 0.55 | 136 |
| 2 | 0.45 | 140 |
| 3 | 0.33 | 149 |
| 4 | 0.23 | 152 |
| 5 | 0.21 | 162 |
| 6 | 0.20 | 163 |
| 7 | 0.18 | 154 |
| 8 | 0.10 | 151 |

From the data presented in foregoing Table I and with reference to the accompanying drawing, it will be seen that the silica-alumina-nickel-tungsten catalysts with an atomic ratio from about 0.1 to about 0.3 exhibit superior hydrocracking activity. Datum points 1 through 8 in the drawing are representative of the results obtained with catalysts 1 through 8, respectively. These data were employed in preparing curve 9 of the drawing, which curve clearly illustrates the criticality attached to an atomic ratio within the range of about 0.1 to about 0.3, in order to maximize hydrocracking activity. The additional economic advantages afforded through this particular result will be readily recognized by those possessing skill within the art of petroleum refinery processes.

The foregoing specification and example clearly illustrate the improvements encompassed by the present invention and the benefits to be afforded a process for the production of lower boiling hydrocarbon products.

We claim as our invention:

1. A catalytic composite comprising a combination of a nickel component, and tungsten component with a silica-alumina carrier material wherein the atomic ratio of nickel to nickel plus tungsten is about 0.1 to about 0.3.

2. The catalytic composite of claim 1 further characterized in that said atomic ratio is from about 0.15 to 0.25.

3. The catalytic composite of claim 1 further characterized in that said silica-alumina carrier material is one/sixteenth inch diameter spherical particles.

4. A catalytic composite as defined in claim 1 wherein said composite contains, on an elemental basis, about 1 to about 25 wt. % of tungsten and nickel.

5. A catalytic composite comprising a combination of the catalyst composite of claim 1 with a sulfur component in amounts sufficient to incorporate about 0.05 to about 1 wt. % sulfur, calculated on an elemental basis.

* * * * *